United States Patent
Andersson et al.

(10) Patent No.: US 8,028,167 B2
(45) Date of Patent: Sep. 27, 2011

(54) METHOD AND APPARATUS FOR CERTIFICATE ROLL-OVER

(75) Inventors: Stefan Andersson, Klågerup (SE); Janne Karppinen, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 669 days.

(21) Appl. No.: 11/916,546

(22) PCT Filed: Jun. 2, 2006

(86) PCT No.: PCT/EP2006/062896
§ 371 (c)(1),
(2), (4) Date: Jul. 3, 2008

(87) PCT Pub. No.: WO2006/131505
PCT Pub. Date: Dec. 14, 2006

(65) Prior Publication Data
US 2008/0307229 A1     Dec. 11, 2008

Related U.S. Application Data

(60) Provisional application No. 60/692,022, filed on Jun. 17, 2005.

(30) Foreign Application Priority Data

Jun. 7, 2005   (EP) .................................. 05012199

(51) Int. Cl.
*H04L 9/32*       (2006.01)
*H04L 29/06*     (2006.01)
*G06F 7/04*       (2006.01)

(52) U.S. Cl. ........ 713/175; 713/156; 713/157; 713/158; 713/159; 713/165; 713/178; 713/182; 713/193; 713/194; 726/1; 726/2; 726/4; 726/5; 726/10; 726/26; 726/30

(58) Field of Classification Search ................. 713/156, 713/173, 175, 193; 726/10
See application file for complete search history.

(56) References Cited

U.S. PATENT DOCUMENTS

| | | | |
|---|---|---|---|
| 5,903,882 A * | 5/1999 | Asay et al. ..................... 705/44 |
| 6,134,327 A | 10/2000 | Van Oorschot | |
| 6,903,564 B1 * | 6/2005 | Suzuki ..................... 324/762.02 |
| 7,207,060 B2 * | 4/2007 | Immonen et al. ............... 726/10 |

(Continued)

FOREIGN PATENT DOCUMENTS

WO     00/72149     11/2000

OTHER PUBLICATIONS

International Search Report for corresponding Application No. PCT/EP2006/062896 dated Aug. 16, 2006.

*Primary Examiner* — Edan Orgad
*Assistant Examiner* — Jenise E Jackson
(74) *Attorney, Agent, or Firm* — Renner, Otto, Boisselle & Sklar, LLP

(57) ABSTRACT

A method and an electronic apparatus for rolling over from a first to second trusted certificate in the electronic apparatus. Information containing identification data for identifying the second trusted certificate is acquired in the electronic apparatus. Also, the second trusted certificate, which is preinstalled in the electronic apparatus, is activated based on said identification data.

19 Claims, 4 Drawing Sheets

U.S. PATENT DOCUMENTS

| | | | |
|---|---|---|---|
| 7,536,544 B2* | 5/2009 | Xiao | 713/158 |
| 2001/0011255 A1* | 8/2001 | Asay et al. | 705/76 |
| 2002/0071563 A1* | 6/2002 | Kurn et al. | 380/280 |
| 2002/0098830 A1 | 7/2002 | Lauper et al. | |
| 2005/0193204 A1* | 9/2005 | Engberg et al. | 713/175 |
| 2005/0257058 A1* | 11/2005 | Yoshida et al. | 713/175 |
| 2006/0174323 A1* | 8/2006 | Brown et al. | 726/3 |
| 2006/0265499 A1* | 11/2006 | Menasce et al. | 709/225 |
| 2006/0294593 A1* | 12/2006 | Eldar et al. | 726/26 |
| 2007/0130439 A1* | 6/2007 | Andersson et al. | 711/200 |
| 2009/0319783 A1* | 12/2009 | Thornton et al. | 713/156 |

\* cited by examiner

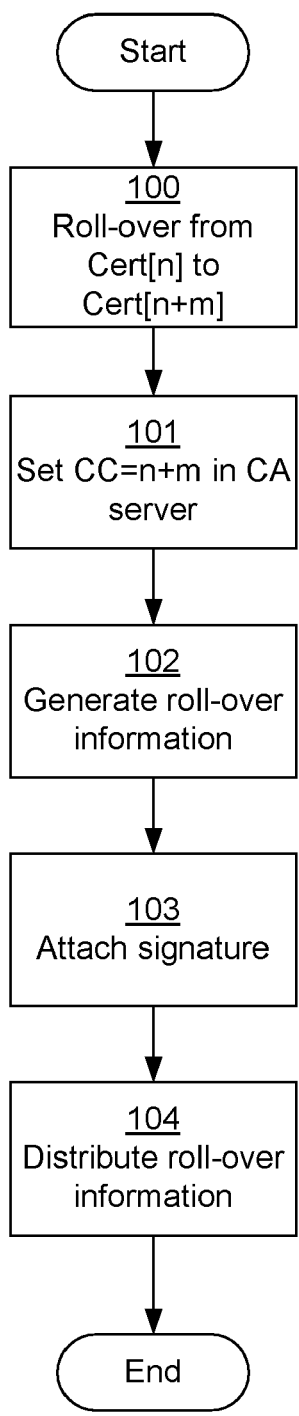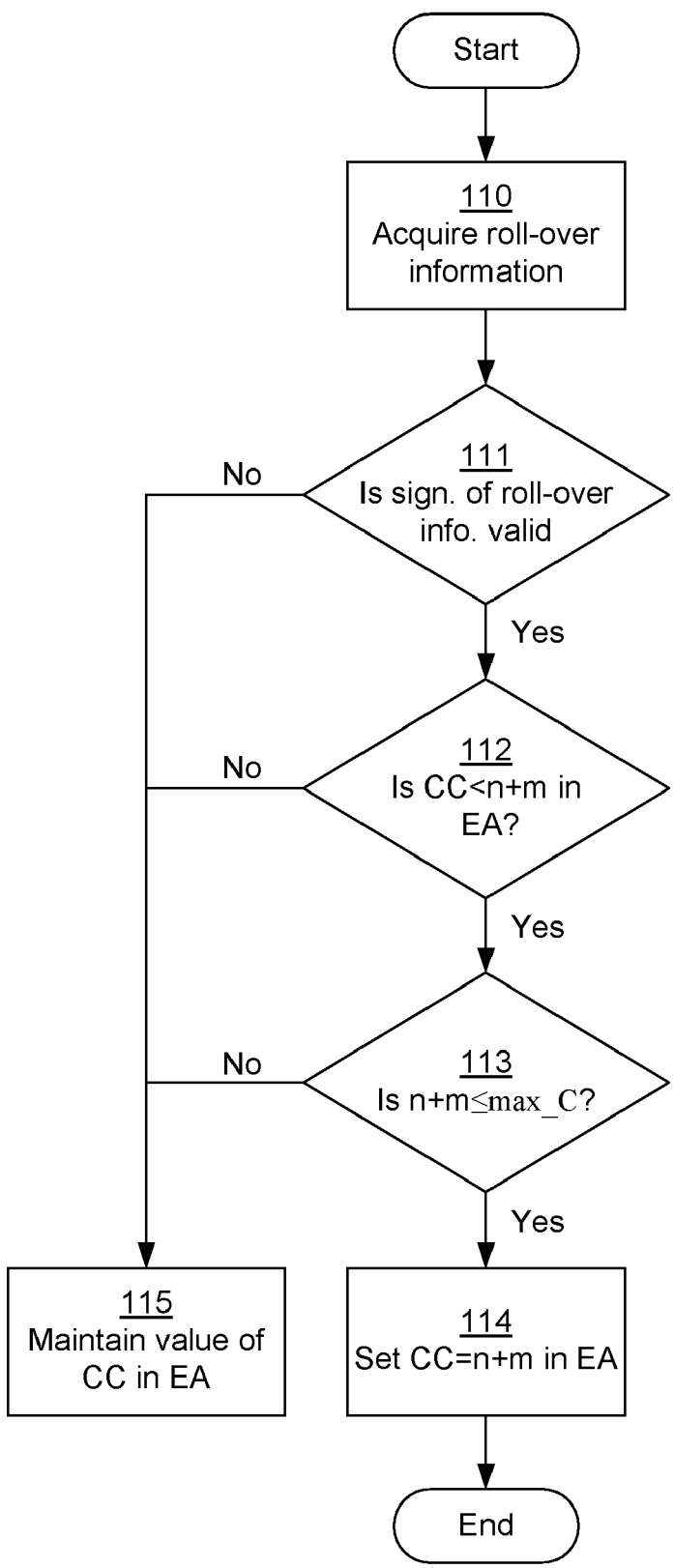
Fig 3a
Fig 3b

METHOD AND APPARATUS FOR CERTIFICATE ROLL-OVER

This application is a §371 of International Application No. PCT/EP2006/062896 filed on Jun. 2, 2006, which claims benefit to U.S. Provisional Application No. 60/692,022 filed on Jun. 17, 2005, and also claims priority to European Application No. 05012199.5 filed on Jun. 7, 2005.

TECHNICAL FIELD OF THE INVENTION

The present invention relates to a method and an apparatus for performing a certificate roll-over from a first to a second trusted certificate in the apparatus.

DESCRIPTION OF RELATED ART

In an electronic apparatus, such as a mobile terminal, a PKI (Public Key Infrastructure) scheme may be used for increasing the level of confidence of information received from an external entity.

A PKI scheme comprises a digital trusted certificate, which is issued by a certification authority (CA) and which may contain a name or identification number of the apparatus, a serial number, expiration date and a public key.

The trusted certificate is signed by the CA using the private key of the trusted certificate to prevent its modification or falsification. The authenticity of the signature of the trusted certificate, and whether the CA of a certificate can be trusted, can be determined by examining the certificate used to generate the signature. The chain finally ends in a root certificate.

A software package for an electronic apparatus may be signed by the manufacturer using its private key of a root certificate or a trusted certificate associated with the root certificate. The signature may be a checksum generated by means of the private key on data relating to the software package. The software package with the attached signature may be installed in a memory of the apparatus, e.g. at the time of manufacturing of the apparatus.

The signature attached to the software packet may be used to verify that a hacker has not patched the software package. A digital signature of the software package may be verified using the public key from a trusted certificate associated with the root certificate. If the verification fails, the software package has been hacked. However, the verification requires access to the trusted certificate and its associated public key. The trusted certificate and its associated public key may be preinstalled in or delivered on demand to the electronic apparatus.

If it is determined that the software package has been hacked, an updated software package may be generated and distributed to the electronic apparatus. A digital signature, which is attached to the updated software package, may be generated by means of a private key associated with a second trusted certificate.

The updated software may be distributed to the electronic apparatus using e.g. a FOTA (Firmware Over The Air) service. To verify the updated software package, the second trusted certificate and its associated public key has to be distributed to the electronic apparatus. This may e.g. be done by transmitting the second trusted certificate and its associated public key in a message. However, using a scheme where the certificate is transmitted involves a risk that an unauthorized part may transmit the certificate to the electronic apparatus instead of an authorized party.

Once the updated software is installed in the electronic apparatus, a certificate roll-over process has to be performed. The certificate roll-over process makes sure that the second trusted certificate is applied instead of the previously applied trusted certificate. Then, the signature of the updated software package may be verified using the public key of the second trusted certificate.

It may also be desired that the first trusted certificate should be revoked, such that the first software package may not be reused. The revocation may be performed using a revocation mechanism, such as CRL (certificate revocation list), or OCSP (Online Status Control protocol). However, it is a problem with these revocation mechanisms that they either require large amounts of storage capacity on the electronic apparatus (CRL) or continuous network access (OCSP).

Furthermore, in case the trusted certificate has been compromised, it is a risk that the trusted certificate is rolled-over to a new trusted certificate controlled by the hacker. Therefore, there is a need for a cheap and fast way of making certificate roll-over in many devices while knowing that no other part has been able to introduce its own certificate. However, certificate roll-over mechanisms known in the art are neither cheap nor fast. This is especially true if the trusted certificates have to be administrated and distributed to many electronic devices. Also, it may not be known whether an unauthorized part has been able to introduce its own certificate in the electronic apparatus.

SUMMARY OF THE INVENTION

It is an object of the invention to provide a roll-over mechanism to roll-over from a first to a second trusted certificate in an electronic apparatus.

According to a first aspect, a method for rolling over from a first to second trusted certificate in an electronic apparatus comprises acquiring in the electronic apparatus information containing identification data for identifying the second trusted certificate. The second trusted certificate, which is preinstalled in the electronic apparatus, is activated based on the identification data.

The step of acquiring information may comprise acquiring identification data for identifying one of a plurality of trusted certificates preinstalled in an array of trusted certificates, one of which may be activated at the time.

The step of acquiring may comprise receiving a message containing the information. The message may be a push message.

The step of activating may comprise verifying a signature being attached to the information with a key of the second trusted certificate.

The step of acquiring may comprise retrieving from the information a value of the identification data, and using the value to identify a pointer or an address to the second trusted certificate.

The step of activating may also comprise a replay protection check.

The step of activating may comprise determining whether a value of the identification data exceeds a certificate counter value, which identifies the first trusted certificate in an array of trusted certificates. The second trusted certificate is only activated if the value of the identification data exceeds the certificate counter value.

The step of activating may comprise checking whether the value of the identification data exceeds a predetermined maximum value.

The step of activating may comprise accessing the second trusted certificate from a memory area of a memory, which is only writable during booting of the electronic apparatus.

According to a second aspect, an electronic apparatus for rolling over from a first to second trusted certificate comprises an information acquiring unit, which is adapted to acquire information containing identification data for identifying the second trusted certificate; and a roll-over unit that is adapted to activate the second trusted certificate, which is preinstalled in the electronic apparatus, based on the identification data.

The information acquiring unit may be adapted to acquire identification data for identifying one of a plurality of trusted certificates, which are preinstalled in an array of trusted certificates, one of which may be activated at the time.

The information acquiring unit may be adapted to receive a message containing the information. The message may be a push message.

The roll-over unit may be adapted to verify a signature being attached to the information with a key of the second trusted certificate.

The information acquiring unit may be adapted to retrieve from the information a value of the identification data, and the roll-over unit may be adapted to use the value to identify a pointer or an address to the second trusted certificate.

The roll-over unit may be adapted to make a replay protection check.

The roll-over unit may be adapted to determine whether a value of the identification data exceeds a certificate counter value, which identifies the first trusted certificate in an array of trusted certificates, and only activate the second trusted certificate if the value of the identification data exceeds the certificate counter value.

The roll-over unit may be adapted to check whether the value of the identification data exceeds a predetermined maximum value.

The roll-over unit may be adapted to access the second trusted certificate from a memory area of a memory, which is only writable during booting of the electronic apparatus.

The first and second trusted certificates may be root certificates.

The electronic apparatus may be a portable or handheld mobile radio communication equipment, a mobile radio terminal, a mobile telephone, a pager, a communicator, an electronic organizer, a smartphone, a computer, a SIM or a smart card.

According to a third aspect, a computer program product comprising computer program code means for executing the method according to the invention, when the computer program code means are run by an electronic device having computer capabilities.

Further embodiments of the invention are defined in the dependent claims.

It is an advantage of the invention that roll-over from the first to the second trusted certificate may be made fast and cheaply. It is also an advantage that the roll-over mechanism is secure.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

Further objects, features and advantages of the invention will appear from the following detailed description of embodiments of the invention, reference being made to the accompanying drawings, in which:

FIG. 3a is a flow-chart for generating roll-over information;

FIG. 3b is flow-chart of a method for rolling over from a first to a second trusted certificate;

DETAILED DESCRIPTION OF EMBODIMENTS

Figure 1:
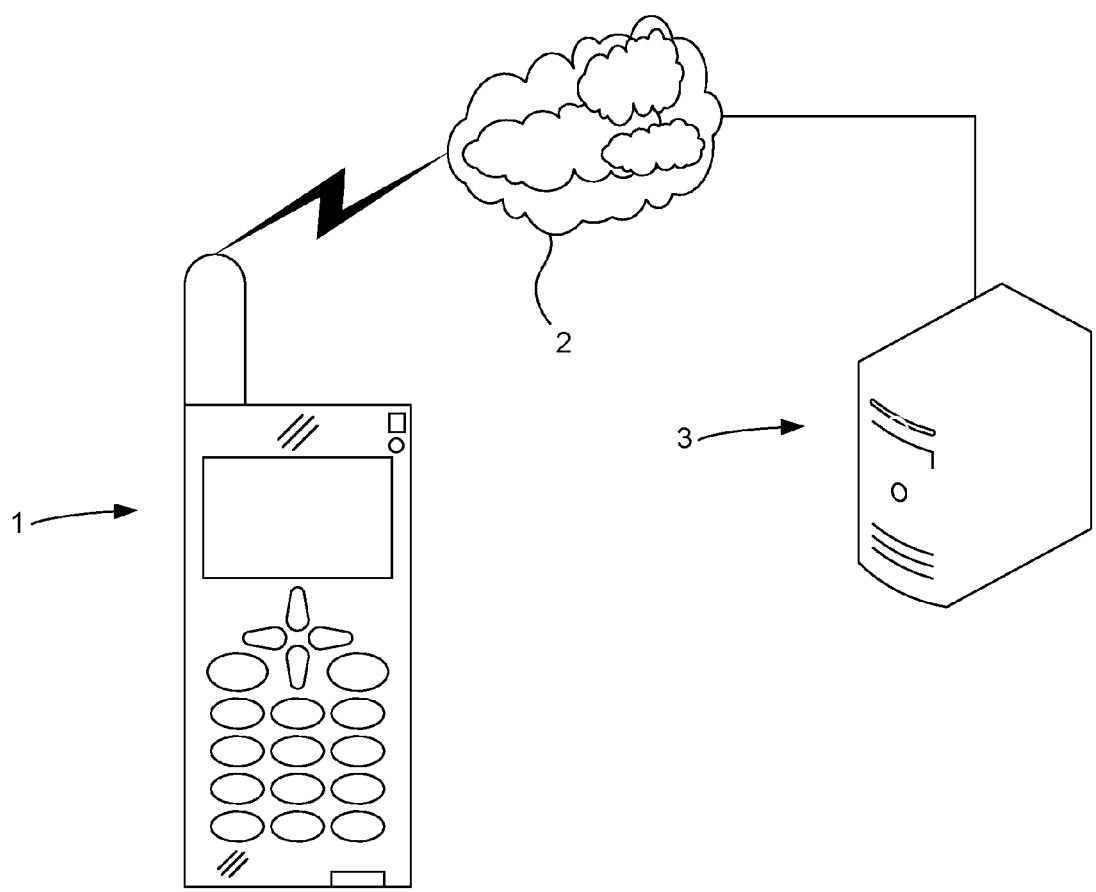
FIG. 1 is a front-view of an electronic apparatus connected to a network.

FIG. 1 illustrates an electronic apparatus 1. The electronic apparatus 1 may e.g. be a portable or handheld mobile radio communication equipment, a mobile radio terminal, a mobile telephone, a pager, a communicator, an electronic organizer, a smartphone, a computer, a SIM (Subscriber Identity Module), or a smartcard.

The electronic apparatus a may be a wired or wireless communication apparatus. It may also be connectable to a wired or wireless communication network 2, such as a WAN (Wide Area Network) or telecommunication network, such as a GSM (Global System for Mobile communication), a WCDMA (Wideband Code Division Multiple Access), or a PDC (Personal Digital Cellular) telecommunication network.

A server 3 may be connected to the network 2. The server 3 may be a CA server, which is adapted to administer trusted certificates. Alternatively, the server 3 is controlled by an operator, which administrates e.g. certificate roll-over.

Figure 2:
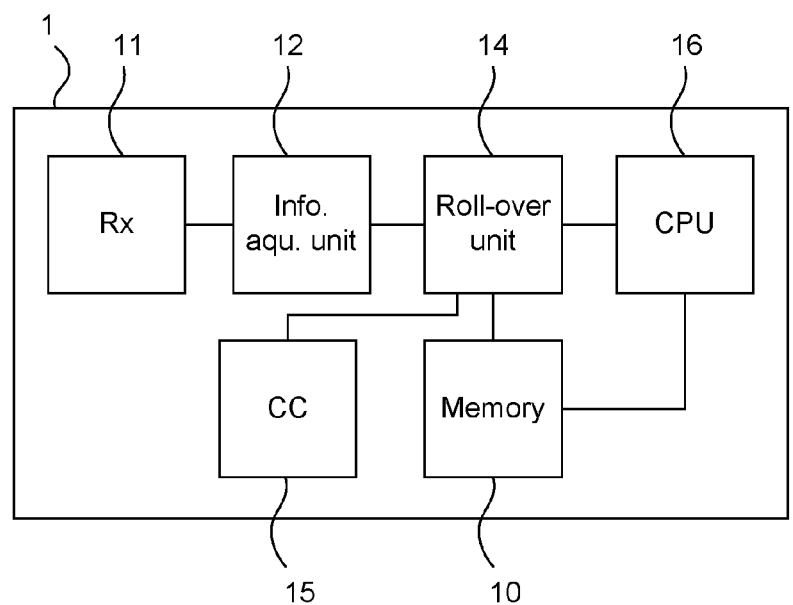
FIG. 2 is a block diagram of the electronic apparatus.

According to the invention, the electronic apparatus 1 comprises at least a first and a second trusted certificate preinstalled in a memory 10 (FIG. 2). If it is desired to roll-over from the first to the second trusted certificate, an indication to perform said roll-over is delivered to the electronic apparatus 1.

A trusted certificate may be a root certificate. Alternatively, a trusted certificate may be a certificate in a chain of certificates, which are associated with and ultimately ends at a root certificate.

To perform the roll-over in a controlled way, roll-over information containing identification data for identifying the second trusted certificate to be activated is acquired in the electronic apparatus 1. Then, the second trusted certificate, which is preinstalled in the electronic apparatus, can be activated based on said identification data. It is an advantage to have at least a first and a second trusted certificate preinstalled in the electronic apparatus 1, as the roll-over may be made cheaply and fast in many devices. Furthermore, trusted certificates does not have to be delivered to the electronic apparatus, which may require both large network resources as well as administration of the new trusted certificates. Pre-installed trusted certificates also have the advantage that it is secure, as it prevents rolling-over to a certificate delivered and controlled by a hacker.

The electronic apparatus 1 may be adapted to deny accepting any certificates transmitted to it. If the currently applied trusted certificate has been compromised by a hacker, there is a risk that the trusted certificate is rolled-over to a certificate controlled by the hacker, if the new certificate is transmitted and installed according to the prior art. With the invention it is made certain that no other party may introduce their own certificate, as it is only possible to roll-over to pre-installed trusted certificates.

The roll-over information may be delivered to the electronic apparatus 1 in a multitude of ways. For example, the roll-over information may be transmitted in a push message from the server 3 to the electronic apparatus 1. The push message may e.g. be an SMS (Short Message Service), an EMS (Enhanced Message Service), or an MMS (Multimedia Messaging Service) message. The message may contain the roll-over information and a message type indicator, which identifies that it is a message carrying roll-over information. Alternatively, the roll-over information may be delivered over a WAN, such as Internet. Still another way is to insert a removable memory device containing the roll-over information into the electronic apparatus 1. The removable memory device may e.g. be a memory stick, a memory card, or a SIM (Subscriber Identity Module) or a smart card. Thus, a SIM or smart card may be used to implement the electronic apparatus 1 as well as for acquiring the roll-over information. Also, it is possible to transmit the roll-over information over a short range wireless link, such as a Bluetooth® or IR (InfraRed) link. Still another possibility is to connect the electronic apparatus 1 to the server 3 by means of a wire, over which the roll-over information may be transmitted.

Acquiring the roll-over information by receiving a push message in the electronic apparatus has the advantage that roll-over information may be delivered from the server 3 to many electronic apparatuses at the same time. Also, a push message is cheap to deliver, as it contains relatively little data, and thus requires relatively little network resources.

In one embodiment, the electronic apparatus 1 comprises a plurality, e.g. 5-10, trusted certificates, which are useable or dedicated for the same purpose. The root certificates that are useable for the same purpose may be preinstalled in an array of root certificates (FIGS. 4a-4b, 5a-5b, 6a-6b). Only one of the root certificates of one array may be active at the time. Alternatively, more than one active root certificate of the array may be active at the time. The trusted certificates of the array may end at the same or different root certificates.

In another embodiment, the electronic apparatus 1 comprises more than one array of trusted certificates that are useable or dedicated for the same purpose. Each array comprise at least a first and a second trusted certificate, between which roll-over may be made according to the invention.

In still another embodiment, the electronic apparatus 1 comprises one or several arrays of trusted certificates that are useable or dedicated for the same purpose. Also, the electronic apparatus may comprise one or more individual trusted certificates, each of which may be active at the same time as a trusted certificate of any of the arrays. The individual certificate(s) may be active for another purpose than the purpose for which the trusted certificate of the array is active.

A certificate counter (CC) 15 may be used to identify the currently active trusted certificate. The value of CC may identify the location of the currently active trusted certificate within the array. E.g. if trusted certificate number 3 within the array is active the value of CC=3. Therefore, the identification data of the roll-over information may be an identifier or number, such as an integer, which identifies the location of the trusted certificate to activate within the array. The identifier may be mapped to pointers or addresses of a certificate table stored in the electronic apparatus. Each pointer or address is associated with the order of the trusted certificate within the array.

To further increase security, integrity protection of the roll-over information may be provided. A digital signature, such as a checksum, may be attached to the roll-over information. Before any data in the roll-over information is used, the integrity of the roll-over information is checked. The digital signature attached to the roll-over information may be generated by the server 3 using the private key of the trusted certificate identified in the roll-over information. For example, the currently active trusted certificate should be changed from Cert[1] to Cert[2]. Thus, the value of CC should be updated from CC=1 to CC=2. The private key of Cert[2] has been used for generating the digital signature attached to the roll-over information. The attached signature may be verified by generating in the electronic apparatus 1 a digital signature of the acquired roll-over information using the public key of the trusted certificate identified in the roll-over information. If the acquired and the generated signatures match, the roll-over information is verified. When the roll-over information has been verified, it may be applied.

When a previously used trusted certificate is no longer active, it may be made unusable. The memory block or register storing the previously used trusted certificate may be overwritten at least partly by amending at least a portion of the data of the certificate. Data of the trusted certificate may e.g. be changed from "1" to "0".

Providing a replay protection check to prevent that a previously used trusted certificate is reused may also increase the security. Before the roll-over information is applied, the value of the identification data may be determined. Then, a certificate counter value stored in electronic apparatus may be determined, e.g. CC=1. Only if the value of the identification data exceeds the value of the certificate counter value the roll-over procedure is made. In this example the value of the identification data, 2, exceeds the certificate counter value, 1, and a roll over procedure to roll-over from trusted certificate Cert[1] to trusted certificate Cert[2] may be initiated.

In another embodiment, replay protection is provided by a time-stamp included in the roll-over information. The electronic apparatus 1 may store the time stamp of any previously used and the currently used trusted certificate. If the time stamp of the roll-over information does not exceed any of the stored time stamps, the roll-over procedure is not initiated. The acquired time stamp may alternatively be compared to the value of a secure clock or counter. If the value of the acquired time stamp exceeds the value of the secure clock or counter more than a predetermined amount, the roll-over procedure is not initiated.

In still another embodiment, the replay protection mechanism is provided by a challenge-response procedure. The electronic apparatus 1 challenges the server 3, which sends a response. The roll-over information is not used unless a correct response is received.

To make sure that a trusted certificate, to which roll-over should be made, is actually preinstalled in the electronic apparatus, is present, a maximum certificate check may be made. A predetermined maximum current certificate value, max_C, may be stored in the electronic apparatus 1. The value of the identification data may be compared to max_C. If the value of the identification data exceeds max_C, the roll-over procedure is not made.

FIG. 2 illustrates the electronic apparatus 1, which may comprise a receiver 11. The receiver may be adapted for communication with the network 2. It may be a receiver for wireless or wired reception. An information acquiring unit 12 may be connected to the receiver 11, from which it may acquire the roll-over information. The electronic apparatus may comprise one or several memories, which are illustrated jointly by memory 10. Memory 10 may e.g. comprise a ROM (Read Only Memory) a RAM (Random Access Memory) a flash memory, and/or a non-volatile memory. In memory 10 the array of trusted certificates may be stored. A roll-over unit 14 is adapted to perform roll-over functions, as will be described below. The certificate counter 15 stores a value for identifying the current trusted certificate applied in the electronic apparatus 1. A processor 16, such as a CPU (Central Processing unit), may implement information acquisition unit 12, the roll-over unit 14 and/or the certificate counter 15, which may be implemented by software. Alternatively, the roll-over unit 14 and/or the certificate counter 15 are implemented by hardware, such as ASICs (Application Specific Integrated Circuits) or FPGAs (Field Programmable Gate Arrays). The information acquisition unit 12, the roll-over unit 14 and the certificate counter 15 are illustrated as separate units. However, the may alternatively be provided as a single unit.

FIG. 3a illustrates method for generating and delivering the roll-over information in server 3. In step 100, it is determined that a roll over from Cert[n] to Cert[n+m] is desired. A certificate counter, CC, (not shown) may be provided in the server 3. The certificate counter in the server 3 stores the value or number of the currently applied trusted certificate in the electronic apparatus 1. Thus, the value of CC=n in the electronic apparatus 1 and the server 3 if they are synchronized. m is an increment. The value of CC may be incremented in one or several steps. Thus, roll-over from a first to a subsequent trusted certificate directly following the first trusted certificate in the array of trusted certificates may be made by incrementing the value of CC by 1. Alternatively, roll-over from a first to a subsequent trusted certificate, which is not directly following the first trusted certificate in the array of trusted certificates may be made by incrementing the value of CC by more than 1.

In step 101, the value of the certificate counter is set in the server 3, CC=n+m, by incrementing the current value of CC.

In step 102, the roll-over information is generated. The identification data for identifying Cert[n+m] is included in said information. The identification data may e.g. be the value n+m.

In step 103, a signature of the roll-over information is generated and attached thereto. The roll-over information may e.g. comprise the value n+m. The signature is generated by means of the private key of trusted certificate n+m.

In step 104, the roll-over information is distributed to the electronic apparatus 1. The roll-over information may e.g. be transmitted in a push message to the electronic apparatus. The electronic apparatus 1 may e.g. be identified in the server 3 by an identifier. Furthermore, the roll-over information may contain the identifier for identifying the electronic apparatus for which the roll-over information is intended. The identifier may be a unique identifier, such as a telephone number, an IMSI (International Mobile Subscriber Identity), or an IMEI (International Mobile Equipment Identity). Alternatively, the identifier may be a group identifier. The group identifier may e.g. be a certain type, model, or model version of the electronic apparatus 1. Alternatively, the group identifier may e.g. be a software identifier for identifying a certain type or version of a software package, which is applied in the electronic apparatus 1.

Before the roll-over information is applied in the electronic apparatus 1, the roll-over information may be checked to determine whether said information is actually intended for the electronic apparatus. The check may be made by verifying the received identifier of the roll-over information. The received identifier may e.g. be verified by comparing it to an identifier stored in the electronic apparatus 1.

FIG. 3b illustrates the method for rolling over from the first to the second trusted certificate, which is performed in the electronic apparatus 1. The roll-over information is acquired in step 110 by the acquisition unit 12. The roll-over unit 14 may receive the roll-over information forwarded by the receiver unit 11. The roll-over unit 14 may retrieve from the roll-over information the identification data for identifying the trusted certificate, which should be activated.

In step 111, the signature of the roll-over information is verified. The identification data is used to find a pointer or address to the trusted certificate, Cert[n+m], to be activated. From Cert[n+m] its public key is retrieved. The public key of Cert[n+m] is used to verify the signature of the roll-over information. If the answer in step 111 is yes, the procedure proceeds to step 112.

In step 112, a replay protection check is made. It is checked whether the value of the identification data exceeds the value of CC in the electronic apparatus 1, i.e. whether CC<n+m. If the answer in step 112 is yes, the procedure proceeds to step 113.

In step 113, a maximum certificate check is made. It is determined whether the value of the identification data is less than or equal to max_C, i.e. whether n+m≦max_C. max_C is equal to the number of trusted certificates of the array of trusted certificates. If the answer in step 113 is yes, the procedure proceeds to step 114.

In step 114, the roll-over is performed by rolling over from the currently applied (first) to a new (second) root certificate. The new trusted certificate may be activated by setting CC=n+m. Then, the CC makes reference to the second trusted certificate for any verification or authentication to be made in the future.

If the answers in steps 111, 112, and 113 are no, the procedure proceeds to step 115. In step 115, the currently activate trusted certificate is maintained activated, e.g. by maintaining the current value of CC in the electronic apparatus 1. After steps 114 and 115, the procedure may end.

All steps according to the embodiment of FIG. 3b need not be carried out. For example, it is not necessary to carry out any of steps 111-113. Alternatively, any or a combination of steps 111-113 may be carried out together with steps 110, 114 and 115.

Figure 4A:
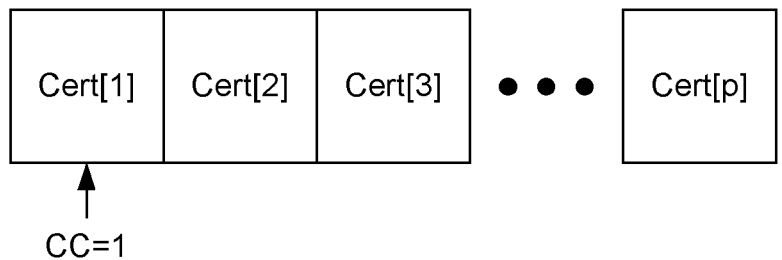
FIGS. 4a-4b are block diagrams of an example of an array of trusted certificates with a current certificate indicator.
Figure 4B:
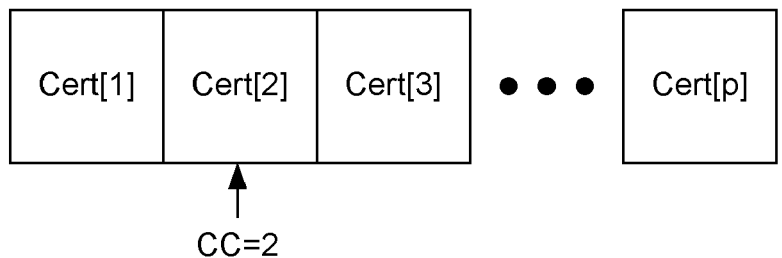

FIGS. 4a-4b illustrate an embodiment of the array of trusted certificates, Cert[1]-Cert[p]. p may e.g. be 5 and is the number of trusted certificates in the array. In this example, CC=1 in both the server 3 and the electronic apparatus 1. Thus, CC=1 makes reference to Cert[1]. A root-roll over to Cert[2] should be made. Thus, roll-over information is generated an distributed to the electronic apparatus 1, e.g. as described in FIGS. 3a-3b. As n+m=2 meets all criteria set out, a roll over to Cert[2] is made, and CC is incremented by 1, CC=1+1=2. Thus, CC makes reference to Cert[2], which is activated (FIG. 4b).

Figure 5A:
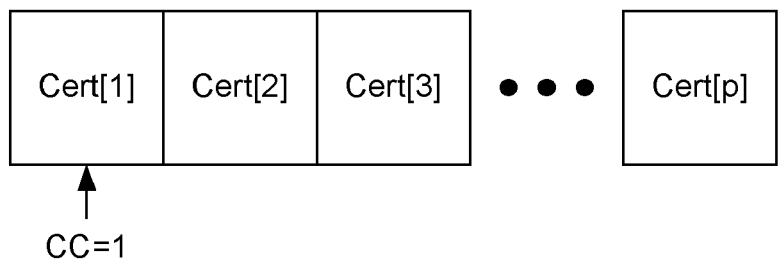
FIGS. 5a-5b are block diagrams of another example of an array of trusted certificates with a current certificate indicator.
Figure 5B:
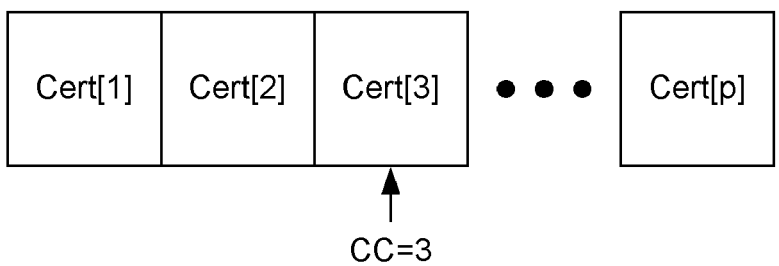

FIGS. 5a-5b illustrates another embodiment of a certificate roll-over in an array of trusted certificates. Should the certificate counters in the server 3 and the electronic apparatus 1 be out of synchronization for any reason, it is still possible to perform certificate roll over. The electronic apparatus 1 accepts any value of the identification data that is higher than the current value of CC. In this example, CC in the server 3 is CC=2 but the value of CC in the electronic apparatus 1 is CC=1. A certificate roll-over to Cert[3] should be made. The procedure according to FIGS. 3a-3b is performed. As all criteria according to the method is met, the value of CC in the electronic apparatus 1 is updated from CC=1 (FIG. 5a) to CC=3 (FIG. 5b). This is an advantage of the invention, as the value of CC of the server 3 and the electronic apparatus 1 will automatically be synchronized without any synchronization process if they are out of synchronization.

Figure 6A:
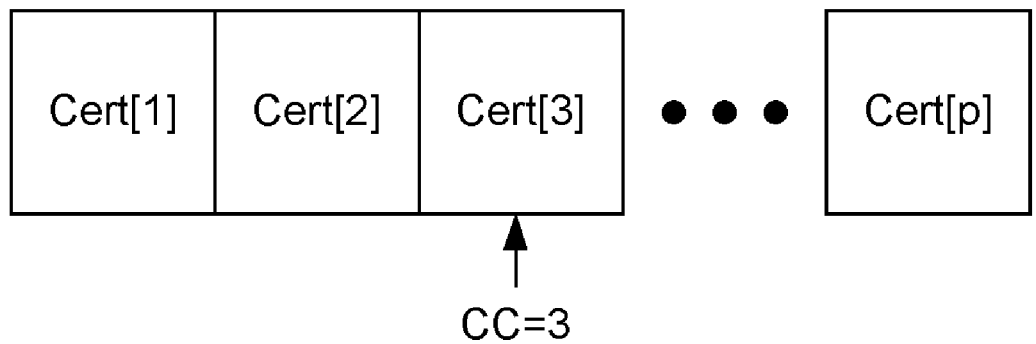
FIGS. 6a-6b are block diagrams of another example of an array of trusted certificates with a current certificate indicator.
Figure 6B:
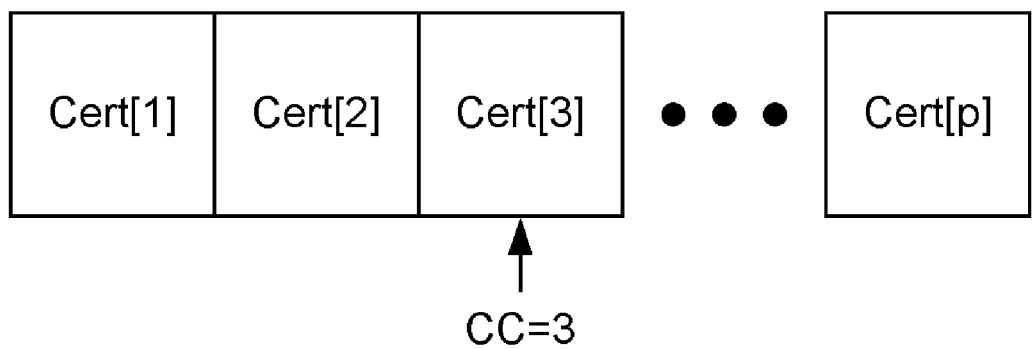

FIGS. 6a-6b illustrates the method when a hacker tries to roll-back to an old compromised or previously used trusted certificate. FIG. 6a illustrates an array of trusted certificates, wherein the value of CC in the electronic apparatus 1 makes reference to Cert[3]. Roll-over information containing identification data to roll over to Cert[2] is distributed to the electronic apparatus 1. However, as the value of CC=3>2, an error results, and the value CC=3 is maintained. Consequently, the previously used trusted certificate is not activated.

The roll-over unit 14 may be adapted to not re-use any previously used trusted certificate. This is an advantage if the trusted certificate is applied together with a software package. The roll-over may be performed in association with updating the electronic apparatus 1 with a an updated software package. Alternatively, the roll-over may be performed in association with an delta updating procedure of the software package. It may also be ascertained that the previous software package may not be used again, if a used trusted certificate is not reusable. This is an advantage e.g. if the previous software package has been compromised by a hacker and is malicious. The signature of the previous software package, which was generated with the key of previously used trusted certificate, will not match a signature generated with the key of a new trusted certificate to which roll-over has been made.

The array of trusted certificates and the CC may be integrity protected. In one embodiment, integrity protection of the array of trusted certificates and the CC is provided by a flash lock down mechanism. The value of CC and the array of root certificates may be stored in a data area of the memory 12, which is only flashable when the electronic apparatus 1 is booted. When the electronic apparatus 1 is booted, a command is issued to the flash memory that makes the flash block(s) carrying the array of trusted certificates and the value of CC read only after booting is completed. Said flash block(s) will remain read only until the next time the electronic apparatus 1 is booted, wherein they are made writable during the booting. When roll-over information is acquired, it may be temporarily stored in the memory 12 until the electronic apparatus 12 is booted, wherein the procedure illustrated in FIG. 3b may be performed. Each time the electronic apparatus 1 is booted, said flash-blocks are unlocked, and it is determined whether any roll-over information has been acquired. If the answer is yes, roll-over from a first to a second trusted certificate should be made. Then, the roll-over information may be verified, the value of CC may be updated to make reference to the second trusted certificate, and the second trusted certificate may be activated. Once said flash block(s) has/have been updated, or if it/they should not be updated (no roll-over information acquired), said flash block(s) may be locked again.

In another embodiment, the certificate array and the CC are integrity protected by storing them in a lockable memory, such as an OTP (One Time Programmable) or a WORM (Write Once Read Many) memory. When new roll-over information is applied, the value of the CC is written into a previously unused register of the lockable memory. When data from the lockable memory should be retrieved, it is read from the register that was last marked as locked. An unlocked register indicates that it is unwritten, i.e. it does not contain any data.

It is an advantage of the integrity protection scheme of the array of trusted certificates and the value of CC that it is independent on the way they are delivered. The integrity protection scheme can also be extended to other types of data, such as any security mechanism, e.g. a trusted certificate download, wherein the entire trusted certificate is downloaded to the electronic apparatus, or downloading of a FOTA upgrade trigger.

In another embodiment, the procedure according to FIG. 3b is initiated as soon as the roll-over information has been acquired.

In one embodiment, the roll-over information and the CC of the server 3 is associated with SIM identification data. The server 3 may e.g. be controlled by an operator which has issued a SIM used in the electronic apparatus 1. When the electronic apparatus 1 is connected to a network controlled by the operator, it is registered and the operator knows that the electronic apparatus 1 is switched on. The roll-over information may then be transmitted to the electronic apparatus 1 once it is detected that the electronic apparatus is connected to the network. This has the advantage that the probability of correct delivery is high.

The invention may be used to perform certificate roll-over in connection with FOTA. It may also be used together with DRM (Digital Rights Management), JAVA or WAP (Wireless Application Protocol). Furthermore, it may be used to disable the possibility to download or use any type of file or application signed with a key associated with the old (disabled) trusted certificate, which may make the electronic apparatus 1 unusable. For example, a software package for enabling one, some or all functionalities useable by the user of the electronic apparatus 1 may have been hacked. Then, it is desired to update the hacked software. However, it may take some time to prepare the updated software. In the meantime, roll-over from a first to a second trusted certificate may be made. Then, any software having a signature attached, which has been generated using the key of the first trusted certificate, may be locked. If the software may not be used without verification, it is not possible to verify it. A signature of the software generated with the key of the second trusted certificate will not correspond to the signature attached to the software. Any function provided by the software will remain disabled until a new software package for said function has been downloaded. The new software package has attached a signature generated using the key of the second trusted certificate. Thus, a verification of the updated software will be successful.

The invention may be embedded in a computer program product, which enables implementation of the method and functions described herein. The invention may be carried out when the computer program product is loaded and run in a system having computer capabilities provided e.g. by a processor. Computer program, software program, program product, or software, in the present context mean any expression, in any programming language, code or notation, of a set of instructions intended to cause a system having a processing capability to perform a particular function directly or after conversion to another language, code or notation.

The present invention has been described above with reference to specific embodiments. However, other embodiments than the above described are equally possible within the scope of the invention. Different method steps than those described above, performing the method by hardware or software, may be provided within the scope of the invention. The different features and steps of the invention may be combined in other combinations than those described. The scope of the invention is only limited by the appended patent claims.

The invention claimed is:

1. A method for rolling over from a first to second trusted certificate in an electronic apparatus; comprising
acquiring in the electronic apparatus information containing identification data for identifying the second trusted certificate; and
activating the second trusted certificate, which is preinstalled in the electronic apparatus, based on said identification data, and wherein the step of activating comprises a replay protection check as well as determining whether a value of said identification data exceeds a certificate counter value, wherein the certificate counter value identifies the first trusted certificate in an array of trusted certificates, and only activating the second trusted certificate if the value of said identification data exceeds said certificate counter value, wherein the value of the identification data is an identifier or number which identifies the location of the second trusted certificate to activate within the array.

2. The method according to claim 1, wherein the step of acquiring information comprises acquiring identification data for identifying one of a plurality of trusted certificates preinstalled in an array of trusted certificates, one of which may be activated at the time.

3. The method according to claim 1, wherein the step of acquiring comprises receiving a message containing said information.

4. The method according to claim 3, wherein the message is a push message.

5. The method according to claim 1, wherein the step of activating comprises verifying a signature being attached to said information with a key of the second trusted certificate.

6. The method according to claim 1, wherein the step of acquiring comprises retrieving from said information a value of said identification data, and using said value to identify a pointer or an address to said second trusted certificate.

7. The method according to claim 1, wherein the step of activating comprises checking whether the value of the identification data exceeds a predetermined maximum value.

8. The method according to claim 1, wherein the step of activating comprises accessing the second trusted certificate from a memory area of a memory, which is only writable during booting of the electronic apparatus.

9. An electronic apparatus for rolling over from a first to second trusted certificate, comprising
   an information acquiring unit adapted to acquire information containing identification data for identifying the second trusted certificate; and
   a roll-over unit adapted to activate the second trusted certificate, which is preinstalled in the electronic apparatus, based on said identification data, and wherein the roll-over unit further is adapted to make a replay protection check as well as adapted to determine whether a value of said identification data exceeds a certificate counter value, wherein the certificate counter value identifies the first trusted certificate in an array of trusted certificates, and only activating the second trusted certificate if the value of said identification data exceeds said certificate counter value, wherein the value of the identification data is an identifier or number which identifies the location of the second trusted certificate to activate within the array.

10. The electronic apparatus according to claim 9, wherein the information acquiring unit is adapted to acquire identification data for identifying one of a plurality of trusted certificates, which are preinstalled in an array of trusted certificates, one of which may be activated at the time.

11. The electronic apparatus according to claim 9, wherein the information acquiring unit is adapted to receive a message containing said information.

12. The electronic apparatus according to claim 11, wherein the message is a push message.

13. The electronic apparatus according to claim 9, wherein the roll-over unit is adapted to verify a signature being attached to said information with a key of the second trusted certificate.

14. The electronic apparatus according to claim 9, wherein the information acquiring unit is adapted to retrieve from said information a value of said identification data, and the roll-over unit is adapted to use said value to identify a pointer or an address to said second trusted certificate.

15. The electronic apparatus according to claim 9, wherein the roll-over unit is adapted to check whether the value of the identification data exceeds a predetermined maximum value.

16. The electronic apparatus according to claim 9, wherein the roll-over unit is adapted to access the second trusted certificate from a memory area of a memory, which is only writable during booting of the electronic apparatus.

17. The electronic apparatus according to claim 9, wherein the first and second trusted certificates are root certificates.

18. The electronic apparatus according to claim 9, wherein the electronic apparatus is a portable or handheld mobile radio communication equipment, a mobile radio terminal, a mobile telephone, a pager, a communicator, an electronic organizer, a smartphone, a computer, a SIM or a smart card.

19. A computer program embodied on a non-transitory computer readable medium comprising computer executable instructions for executing the method according to claim 1, when said computer executable instructions are run by an electronic device having computer capabilities.

* * * * *